(12) United States Patent
Satou

(10) Patent No.: US 7,348,584 B2
(45) Date of Patent: Mar. 25, 2008

(54) INFRARED PROJECTOR

(75) Inventor: Masanori Satou, Atsugi (JP)

(73) Assignee: Nissan Motor Co., Ltd., Kanagawa-Ken (JP)

( * ) Notice: Subject to any disclaimer, the term of this patent is extended or adjusted under 35 U.S.C. 154(b) by 0 days.

(21) Appl. No.: 10/892,137

(22) Filed: Jul. 16, 2004

(65) Prior Publication Data

US 2005/0017204 A1    Jan. 27, 2005

(30) Foreign Application Priority Data

Jul. 17, 2003    (JP)    ............ P 2003-276115

(51) Int. Cl.
*G21F 3/02*    (2006.01)

(52) U.S. Cl. ................................. 250/516.1

(58) Field of Classification Search ............ 250/332, 250/493.1, 504 R; 362/510
See application file for complete search history.

(56) References Cited

U.S. PATENT DOCUMENTS

| | | | |
|---|---|---|---|
| 3,529,200 A | | 9/1970 | Potter et al. |
| 3,585,394 A | * | 6/1971 | Higby et al. ............ 250/214 LA |
| 3,774,086 A | | 11/1973 | Vincent, Jr. |
| 4,614,866 A | | 9/1986 | Liss et al. |
| 4,922,107 A | * | 5/1990 | Rabl et al. ............... 250/504 R |
| 4,990,788 A | * | 2/1991 | Rabl et al. ............... 250/504 R |
| 5,955,854 A | * | 9/1999 | Zhang et al. ............... 318/480 |
| 6,154,149 A | * | 11/2000 | Tyckowski et al. ........ 340/903 |
| 6,417,782 B1 | * | 7/2002 | Darnall ...................... 340/902 |
| 6,559,883 B1 | * | 5/2003 | Fancher et al. ............ 348/164 |
| 6,628,900 B2 | * | 9/2003 | Nakayama et al. ........ 396/200 |
| 6,700,504 B1 | * | 3/2004 | Aslandogan et al. ...... 340/901 |
| 6,780,077 B2 | * | 8/2004 | Baumgartner et al. ..... 446/175 |
| 6,897,459 B2 | * | 5/2005 | Albou ..................... 250/504 R |
| 2001/0002049 A1 | | 5/2001 | Reeh et al. |
| 2002/0120916 A1 | * | 8/2002 | Snider, Jr. .................. 717/100 |
| 2003/0076688 A1 | * | 4/2003 | Kobayashi ................. 362/510 |
| 2003/0095401 A1 | | 5/2003 | Hanson et al. |
| 2003/0114972 A1 | * | 6/2003 | Takafuji et al. ............. 701/45 |
| 2004/0240219 A1 | * | 12/2004 | Oishi et al. ................ 362/487 |
| 2005/0152146 A1 | * | 7/2005 | Owen et al. ................ 362/294 |

FOREIGN PATENT DOCUMENTS

| | | |
|---|---|---|
| JP | 2001-96889 | 4/2001 |
| JP | 2002-270008 | 9/2002 |

* cited by examiner

*Primary Examiner*—Robert Kim
*Assistant Examiner*—Johnnie L Smith, II
(74) *Attorney, Agent, or Firm*—McDermott Will & Emery LLP

(57) ABSTRACT

An infrared projector including: a light source which radiates an infrared ray; and an emitter which emits visible light when exposed to infrared light, wherein the emitter is provided on a position where the infrared ray radiated from the light source reaches.

9 Claims, 3 Drawing Sheets

INFRARED PROJECTOR

BACKGROUND OF THE INVENTION

1. Field of the Invention

The present invention relates to an infrared projector, and particularly, to a vehicular infrared projector for use in a vehicular monitoring system.

2. Description of Related Art

In an infrared projector having an infrared LED (light emitting diode) as a light source, it is not necessary to provide a cut filter to selectively cut off a visible light, which may cause an overheating problem.

SUMMARY OF THE INVENTION

However, in the above-described projector, a user cannot visually check and confirm whether the light source is turned on or turned off since a visible light is not generated from the light source.

The present invention was made in the light of this problem. An object of the present invention is to provide an infrared projector which the user can visually check and confirm whether the light source thereof is turned on or turned off.

An aspect of the present invention is an infrared projector comprising: a light source which radiates an infrared ray; and an emitter which emits visible light when exposed to infrared light, wherein the emitter is provided on a position where the infrared ray radiated from the light source reaches.

BRIEF DESCRIPTION OF THE DRAWINGS

The invention will now be described with reference to the accompanying drawings wherein.

DETAILED DESCRIPTION OF THE PREFERRED EMBODIMENT

Figure 1:
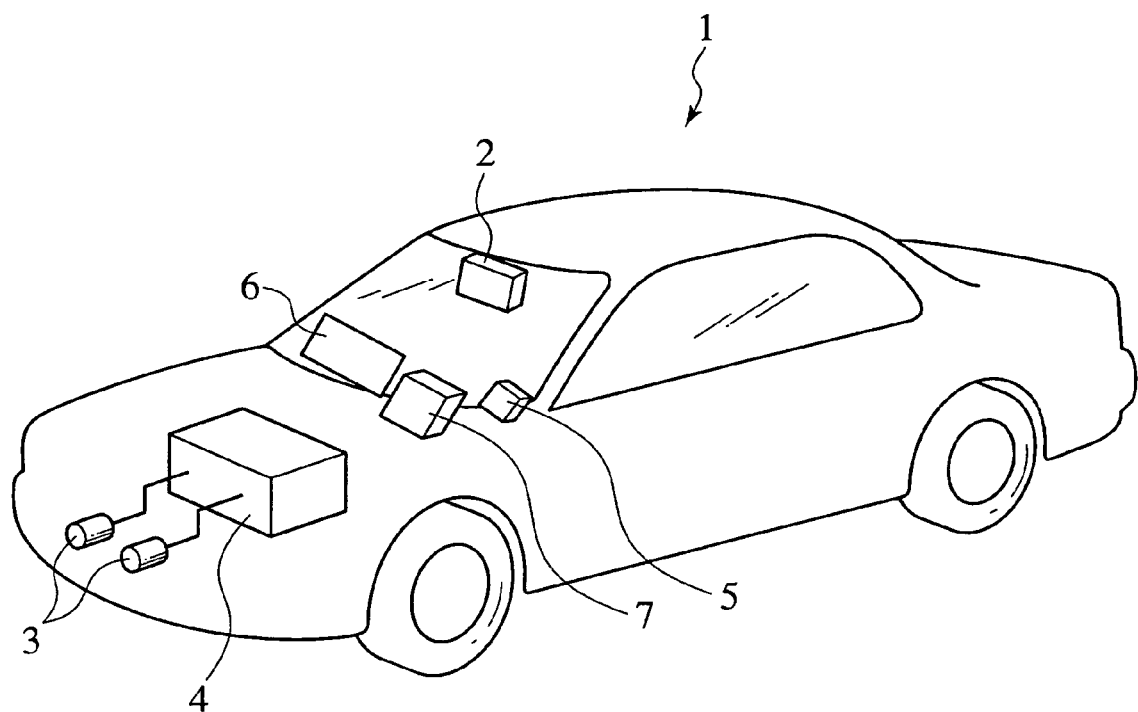
FIG. 1 shows a configuration of a vehicular monitoring system including an infrared projector according to an embodiment of the present invention.

An embodiment of the present invention will be explained below with reference to the drawings, wherein like members are designated by like reference characters.

Light in a wavelength range from visible light to a near infrared ray is present in sunlight and in light of a usual vehicular headlamp.

When strong light beam is emitted from the headlamp, a distant object can be visually identified even at night. An image thereof can also be taken by using a near-infrared camera. However, intensity and illumination range of the light of the headlamp are limited to an extent where a driver of the oncoming driver is not dazzled by the glare of the headlight. Therefore, a vehicular monitoring system is used as an assisting device which provides a driver with information of a wider area ahead of the vehicle. In this system, an infrared projector is used for lightening up the area ahead of the vehicle and the image thereof is taken by the infrared camera, thus providing the driver with the information concerning the distant object and the area ahead of the vehicle without giving trouble to the driver in the oncoming car.

As shown in FIG. 1, a vehicular monitoring system 1 of this embodiment includes an infrared camera 2, infrared projectors 3, a control unit 4, an illuminance sensor 5, an image display device 6, and a car navigation system 7.

In general, an infrared camera adopts either far infrared mode, which senses a heat source, or near infrared mode, which has a high resolution similar to that of a usual micro camera. In the monitoring system 1, the infrared camera 2 adopts the near infrared mode, and the infrared projectors 3 generate the near infrared rays.

In order to take the image of the objects ahead of the vehicle by the infrared camera 2, the infrared projectors 3 project the infrared rays (particularly, the near infrared rays) onto these objects. The infrared rays have longer wavelengths than visible red light and are unidentifiable visually. The control unit 4 connected to the infrared projectors 3 performs a light emission control of light sources 31 thereof. Specifically, the control unit 4 reads signals from the illuminance sensor 5, and upon sensing, for example, that the vehicle is in a dark condition, turns on the light sources 31 of the infrared projectors 3, then, having the infrared camera 2 to start taking the image which is to be displayed on the image display device 6.

The image may also be displayed on the car navigation system 7. Not only when the illuminance sensor 5 senses that the vehicle is in a dark condition, but also when the car navigation system 7 senses that the vehicle has entered a tunnel and the like, the control unit 4 may perform a control of turning on the light sources 31 of the infrared projectors 3.

Figure 2:
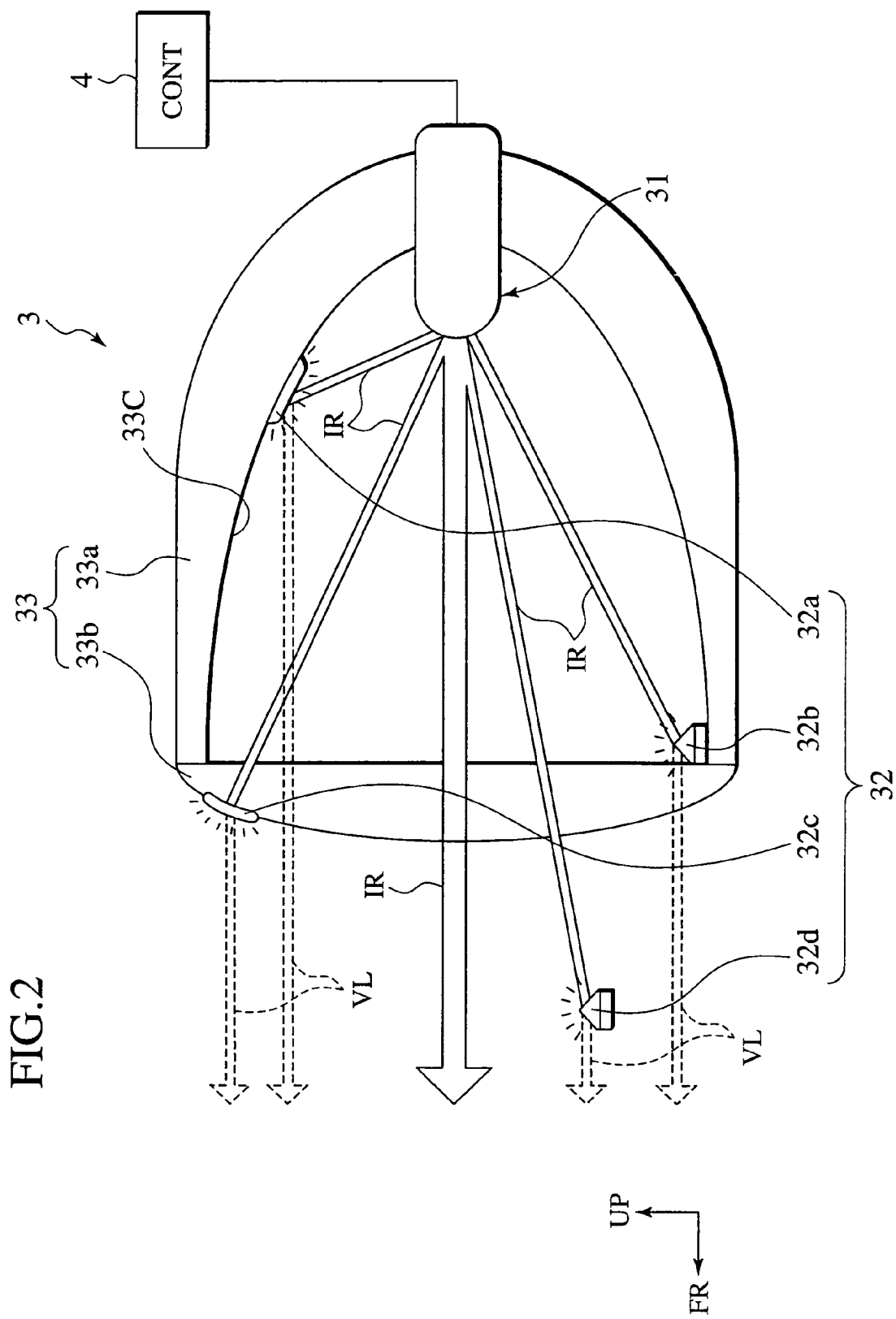
FIG. 2 shows a configuration of the infrared projector shown in FIG. 1.

The infrared projectors 3 are LED lamps which generate the infrared light. As shown in FIG. 2, each of the infrared projector 3 has an infrared LED light source 31 which radiates the infrared rays (IR) upon being fed electrical current from the control unit 4, and emitters (visible light emitters, fluorescing members, or phosphors) 32 which are provided on positions where the infrared rays from the light source 31 reach, and which emit visible light (VL) as the result of the absorption of the radiation of the infrared rays.

Each of the emitters 32 is excited by the infrared light and emits the visible light. As this emitter 32, one described in Japanese Patent Laid-Open Publication No. 2001-96889 is used. Note that each emitter 32 may also be the other one which can be excited by light other than the infrared light to emit the visible light. The emitters 32 may be provided on a plurality of spots as shown in FIG. 2, or one emitter 32 may be provided only on one specific spot.

The infrared projector 3 includes a housing portion 33 which houses the light source 31. The housing portion 33 includes a reflector 33a having a reflection surface 33c in a shape of a revolution paraboloid. The reflection surface 33c reflects the infrared rays radiated from the light source 31 and directs a luminous flux thereof toward the front (the left side in the drawing, where the paraboloid is open). Preferably, the light source 31 is disposed on a focal point of the paraboloid. On a front portion of the housing portion 33, a lens 33b which closes a front opening of the reflector 33a is provided. The lens 33b has low reflectivity and cutoff rate, and transmits light in wavelength ranges of the visible light and infrared light therethrough.

One of the emitters 32 (32a) may be painted on the reflection surface 33c by using printing technology. Another emitter 32 (32b) may be placed on an appropriate position in a space surrounded by inner surfaces of the reflections surface 33c and lens 33b. Moreover, still another emitter 32 (32c) may be painted on an outer surface of the lens 33b, and yet another emitter 32 (32d) may be placed outside of the housing portion 33. Specifically, it is satisfactory if the emitters 32 are provided on positions where the infrared rays radiated from the light source 31 can reach. Preferably, the emitters 32 are provided on positions where the emitters 32 can be visually identified with ease without requiring peering into the inside of the projector 3 from the outside. The positions include, for example, ones corresponding to the emitter 32b in the vicinity of the front lens 33b on a lower part of the reflection surface 33c, the emitter 32c on the outer surface of the lens 33b, and the emitter 32d outside of the projector 3. Furthermore, it is desirable to provide the emitters 32 on positions which are sufficiently apart from a primary optical axis of the infrared light emitted by the light source 31 and subjected to the infrared light, in a point of efficient utilization of the infrared light. The positions include, for example, ones corresponding to the emitter 32b in the vicinity of the front lens 33b on the lower part of the reflection surface 33c, and the emitter 32c on the outer surface of the lens 33b, and a position on a lower part of the outer surface of the lens 33b.

Figure 3:
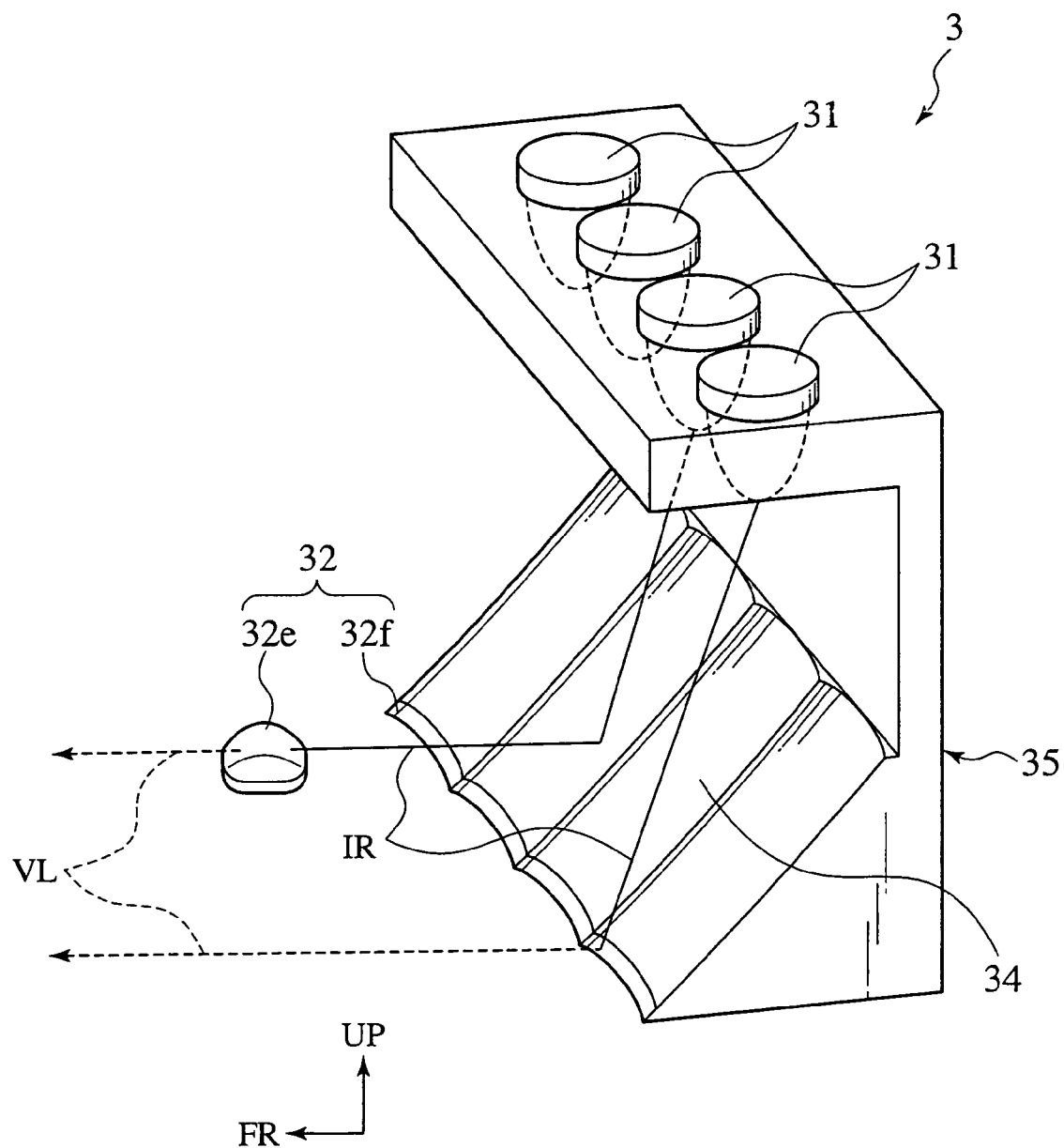
FIG. 3 shows another example of the infrared projector.

Another example of the infrared projector 3, which is shown in FIG. 3, is a unit applicable to a headlamp including the plurality of light sources 31. These light sources 31 are fixed to a resin-made member 35 including a reflection surface 34. In order to reflect infrared light from the respective light sources 31 toward a predetermined direction, the reflection surface 34 has a shape in which a plurality of revolution paraboloids having the respective light sources 31 as focal points are arrayed in parallel.

In this infrared projector 3, one of the emitters 32 (32e) may be provided on an optical path of the infrared light reflected by the reflection surface 34, and the other emitter 32 (32f) may be painted on a lower end portion of the reflection surface 34 by printing. Specifically, as in the example shown in FIG. 2, it is satisfactory if the emitters 32 are provided on positions which are subject to the infrared light from the light sources 31.

Though not illustrated, also in the infrared projector 3 in this example, a housing portion 33 similar to the one shown in FIG. 2 is provided, and houses the plurality of light sources 31 and emitters 32.

Next, an operation of the infrared projector 3 of FIG. 2 will be described. First, when the control unit 4 supplies a current to the light source 31 based on the information from the illuminance sensor 5 or the car navigation system 7, the light source 31 emits infrared light, apart of which is absorbed by the emitters 32 to emit visible light.

In a case where one of the emitters 32 (32a) is painted on the inner surface of the reflection surface 33c of the reflector 33a, the infrared light is converted into the visible light by the emitter 32a when being reflected by the reflection surface 33c. In a case where another emitter 32 (32b) is placed on the inner wall of the housing portion 33, while the infrared light is being converted into the visible light by the emitter 32b without being reflected by the reflection surface 33c, a luminous flux of the visible light is directly directed toward a desired direction.

In a case where still another emitter 32 (32c) is painted on the outer surface of the lens 33b, the infrared light is converted into the visible light by the emitter 32c when transmitting through the lens 33b. Yet another emitter 32 (32d) may be configured, so that when the infrared light transmits therethrough, the emitter directly direct a luminous flux of the visible light toward a desired direction while converting the infrared light into the visible light.

In a similar way to the above, also in the example of FIG. 3, the infrared light from the light sources 31 is converted into the visible light by the emitter 32 (32f) on the reflection surface 34. Alternatively, the infrared light is reflected by the reflection surface 34 and then converted into the visible light by the emitter 32 (32e) provided on the optical path.

In the infrared projector 3 according to this embodiment, the emitters 32 are provided on the positions subject to the infrared rays. These emitters 32 at least emit the visible light when exposed to the infrared light. Accordingly, a user of the vehicle can check the visible light to visually check and confirm whether the infrared light source is turned on or turned off.

Moreover, the emitters 32 are provided inside of the housing portion 33, where infrared rays from the outside are blocked. Accordingly, the emitters 32 emit the visible light only by the infrared light from the light source 31. Therefore, the emitters 32 indicate more accurately whether the infrared projector 3 is turned on and turned off.

Moreover, the emitters 32 are painted and formed, for example, in a thin film. If the emitters 32 are formed in a thick shape, the direction of the luminous flux needs to be adjusted in consideration of a refraction of the light. However, for the emitter 32 in a thin film form, it is not necessary to perform this adjustment, whereby the visible light can be easily directed toward the desired direction.

The preferred embodiment described herein is illustrative and not restrictive, and the invention may be practiced or embodied in other ways without departing from the spirit or essential character thereof. The scope of the invention being indicated by the claims, and all variations which come within the meaning of claims are intended to be embraced herein.

The present disclosure relates to subject matters contained in Japanese Patent Application No. 2003-276115, filed on Jul. 17, 2003, the disclosure of which is expressly incorporated herein by reference in its entirety.

What is claimed is:

1. An infrared projector comprising:
    an invisible light source configured to radiate only invisible lights including infrared rays; and
    a visual indicator configured to indicate an operation condition of the invisible light source by emitting visible light when the visual indicator is excited by infrared rays from the infrared light source.

2. The infrared projector according to claim 1, further comprising a housing portion configured to house the light source, wherein the emitter, is provided inside of the housing portion.

3. The infrared projector according to claim 2, wherein the housing portion comprises a reflection surface for reflecting infrared rays from the infrared light source, and the emitter is provided on the reflection surface.

4. The infrared projector according to claim 2, wherein the emitter is painted.

5. A vehicular projector comprising the infrared projector according to claim 1.

6. A vehicular monitoring system comprising the vehicular projector according to claim 5.

7. A vehicle provided with the vehicular projector according to claim 5.

8. A method for visually checking that an infrared projector is turned on, the method comprising:
    providing an invisible light source configured to radiate only invisible lights including infrared rays and a visual indicator configured to indicate an operation condition of the invisible light source by emitting visible light when the indicator is excited by infrared light from the invisible light source; and
    providing the visual indicator on a position where infrared rays radiated from the light source reach.

9. An infrared projector comprising:
    an invisible light source for radiating only invisible lights including infrared rays; and
    visual indication means for indicating an operation condition of the invisible light source by emitting visible light when the visual indication means is excited by infrared rays from the infrared light source.

* * * * *